March 1, 1932. B. F. DENGLER 1,847,385
VALVE
Filed May 26, 1930
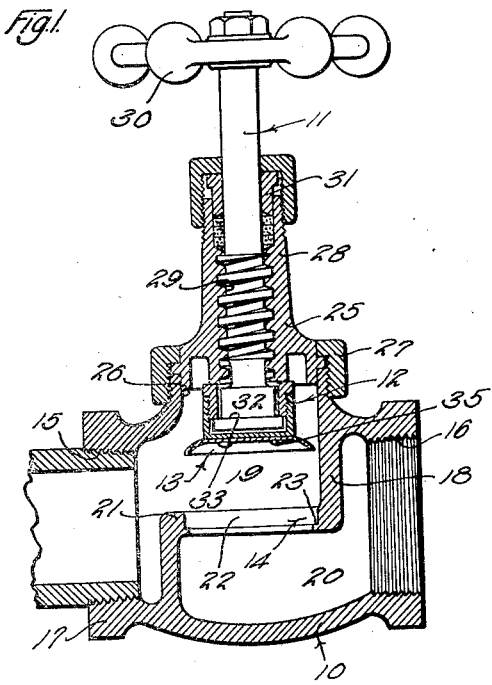
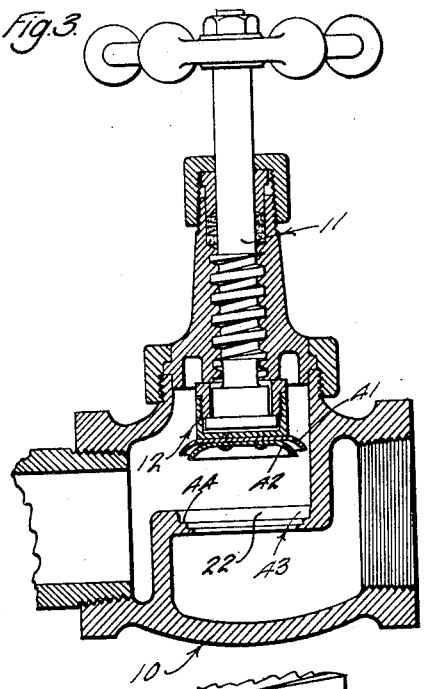
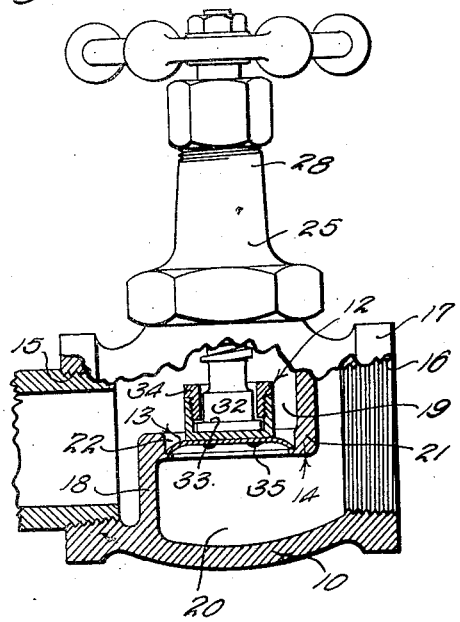
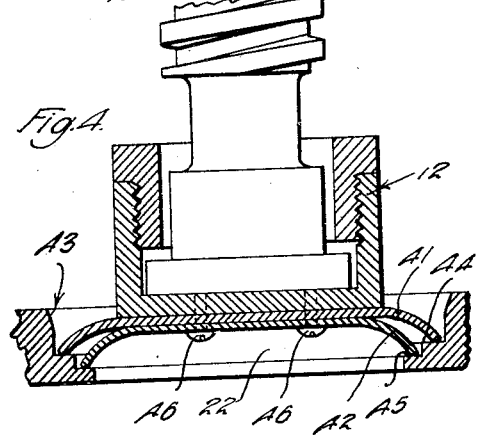
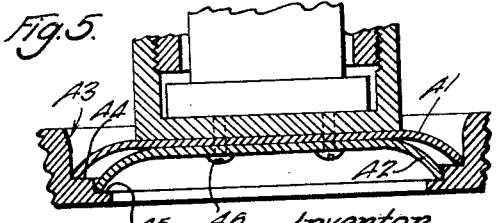
Inventor
BENJAMIN F. DENGLER
by
His Attorney Patented Mar. 1, 1932

1,847,385

UNITED STATES PATENT OFFICE

BENJAMIN FRANKLIN DENGLER, OF LOS ANGELES, CALIFORNIA

VALVE

Application filed May 26, 1930. Serial No. 455,606.

This invention has to do with a device for controlling the flow of fluid and relates more particularly to a valve. It is a general object of the invention to provide a simple, practical, and effective valve.

It is another object of the invention to provide a valve that is particularly effective in making a seal to positively prevent the leakage of light, penetrating oils and like fluids that have a decided tendency to leak through the common types of valves.

It is another object of the invention to provide an improved valve head disc and valve seat construction that is particularly effective in making a fluid-tight seal.

It is another object of the invention to provide a valve wherein a sealing member in the form of a flexible disk is operable to simultaneously seat radially outward and axially downward into tight sealing engagement with a seat.

It is a further object of the invention to provide a replaceable valve head and disc for use in a valve of the character mentioned that is carried on a stem so that it is free to swivel and to tilt a limited extent to center itself for effective sealing engagement with the seat of the valve.

It is a further object of the invention to provide a novel and improved valve construction that may be incorporated or embodied in the common forms of globe valves, angle-faucets, bib-cocks, etc., with but slight, inexpensive changes or modifications.

Other objects and features of my invention will be best and more fully understood from the following detailed description of typical preferred forms and applications of the invention, throughout which description reference will be had to the accompanying drawings, in which:

Fig. 1 is a vertical detailed sectional view of one simple form of the valve provided by this invention illustrating it in the open position. Fig. 2 is a view of the valve with certain parts broken away to illustrate the valve in the closed position. Fig. 3 is a vertical detailed sectional view of another form of the invention showing it in the open position. Fig. 4 is an enlarged detailed sectional view of the valve head and valve seat of the form of invention illustrated in Fig. 3 showing the valve head in the partially operated or closed position, and Fig. 5 is a view similar to Fig. 4 illustrating the valve head in the fully closed or sealing position.

The form of valve illustrated in Figs. 1 and 2 of the drawings includes, generally, a body 10, a stem 11 extending into the interior of the body, a valve head 12 carried by the stem 11, and a flexible or expansible sealing disc 13 on the head 12 to cooperate or seal with a seat 14 in the body 10.

In accordance with the broader principles of the invention, the body 10 may be varied considerably in design and construction. The body 10 illustrated in the drawings is similar, generally, to the body of a common type of globe valve. The body 10 is substantially globular or spherical in its general configuration and is provided with two apertures, namely, an inlet opening 15, and an outlet opening 16. In the particular case illustrated, the openings 15 and 16 are provided at diametrically opposite sides of the body. Outwardly projecting flanges or extensions 17 are provided at the openings 15 and 16 to facilitate connection with pipes or conduits. The extensions 17 may be internally screw threaded to receive the ends of pipe. A partition or web 18 is provided in the interior of the body 10 to divide the interior into two parts or chambers. The web 18 divides the interior of the body into a chamber 19 in communication with the inlet opening 15 and a chamber 20 in communication with the outlet opening 16. The web 18 is provided with a flat central portion 21 in a plane in substantial alignment with the axes of the openings 15 and 16. An opening 22 is provided through the central portion 21 of the web 18 to pass fluid between the chambers 19 and 20 when the valve is in the open position.

In accordance with the preferred form of the invention the walls of the opening 22 form the seat 14 for receiving or cooperating with the sealing disk 13. The outer or upper portion of the wall of the opening 22 or the seat 14 may be curved or beveled upwardly and outwardly to the chamber 19. A shoulder 23 is provided in the opening 22 to receive the sealing disk 13. The shoulder 23 faces upwardly or toward the chamber 19 and is flat and at right angles to the central axis of the opening 22.

The valve stem 11 extends into the interior of the body 10 and carries the head 12 within the chamber 19. The stem 11 is carried by a bonnet or cap 25 arranged over an opening 26 in the wall of the chamber 19. The cap 25 may be removably clamped over the opening 26 by a collar 27 screw-threaded onto the body 10 and engaging over the outer edge of the cap. The cap 25 is provided with an outwardly projecting tubular portion 28 passing or carrying the stem 11. The stem 11 is screw-threaded through the opening 29 of the tubular portion 28 to project from the inner side of the cap 25 into the chamber 19. The outer end of the stem 11 projects outwardly from the portion 28 and an operating hand wheel 30 may be mounted on the outer end of the stem. A suitable packing gland 31 may be provided in the opening 29 to seal with the stem 11. An enlargement 32 is provided on the inner end of the stem 11 within the chamber 19. The enlargement 32 is provided to carry the head 12 and is provided with an outwardly or upwardly facing annular shoulder 33. The enlargement 32 is preferably of round cross sectional configuration to rotatably carry the valve head 12.

The valve head 12 is mounted on the enlargement 32 to rotate or swivel and to tilt bodily relative to the enlargement. The head 12 extends over the lower end of the enlargement 32 and its inner or lower end is flat and is adapted to engage the flat inner end of the enlargement 32. The head 12 is of larger internal diameter than the enlargement 32 so that it is free to tilt and rotate on the enlargement. A retaining collar 34 is screw-threaded into the upper or outer end of the head 12 to prevent displacement of the head from the enlargement 32. The collar 34 freely passes the enlargement 32 and its end is adapted to engage the shoulder 33 to prevent displacement of the head 12. The end of the collar 34 and the shoulder 33 are related so that the head 12 is free to shift longitudinally and to tilt bodily on the enlargement 32 as well as to rotate relative to the enlargement. The collar 34 may have an upper polygonal end portion at the upper end of the head 12 adapted to be engaged by a suitable wrench or the like.

The sealing disk 13 is a round metal disk mounted on the flat inner or lower side of the head 12. The disk 13 is comparatively thin and is formed of a flexible and resilient material. The disk 13 may be formed of bronze, steel, monel-brass, or other metals having the desirable characteristics of flexibility and elasticity. The sealing disk 13 is secured to the flat inner side of the valve head 12 and its peripheral portions project radially outward beyond the periphery of the cap 25. The outwardly projecting peripheral portion of the disk 13 is bent or curved downwardly and outwardly as clearly illustrated throughout the drawings. The central portion of the disk 13 is preferably flat to effectively seat against the flat lower side of the head 12. The disk 13 may be secured to the head 12 in any suitable manner. In the particular case illustrated the disk 13 is removably secured to the head 12 by screws 35. Solder may be applied around the heads of the screws 35 to provide a seal about the screws. The disk 13 is normally of slightly less diameter than the walls of the seat 14 so that its peripheral edge initially engages the upwardly facing shoulder 23 when the stem 11 is operated to close the valve.

The head 12 is mounted on the stem 11 so that the disk 13 may center itself on the seat 14. When the valve head 12 is operated downwardly to close the valve, the peripheral edge of the disk 13 engages the shoulder 23 so that downward pressure on the valve head 12 tends to straighten or flatten out the curved peripheral portion of the disk 13 so that it is expanded to force the peripheral edge of the disk 13 against the side walls of the seat 14. When the valve head 12 and disk 13 are in their final sealing position, the peripheral edge of the disk 13 seats tightly in the corner at the annular line of joinder of the substantially axial wall of the seat 14 and the shoulder 23. The downward pressure exerted through the stem 11 acts to force the peripheral edge of the disk 13 downwardly against the shoulder 23 and, through the tendency of the curved portion of the disk to flatten, forces the peripheral of the disk 13 against the side walls of the seat 14 so that the disk seats downwardly against the shoulder 23 and outwardly against the seat 14 simultaneously to provide an effective seal. Fluid pressure in the chamber 19 with the valve in the closed position tends to flatten out the curved portion of the disk 13 to expand the disk outwardly to bring its peripheral edge into pressure engagement with the seat 14 and acts downwardly to force the disk against the shoulder 23. Upon operation of the stem 11 upwardly to open the valve, the disk 13 returns to its normal shape and diameter so that it is free to pass upwardly from the seat 14. It will be obvious that during rotation of the stem 11 to open or close the valve that the valve head 12 is free to rotate with the stem or to remain stationary and may tilt to effectively center the disk 13 in the valve seat.

In the form of the invention illustrated in Figs. 3, 4, and 5 of the drawings, two sealing disks 41 and 42 are provided on the valve head 12 to provide a double seal. In this form of the invention the body 10, the stem 11, and the valve head 12 may be of the same construction as described in the form of the invention shown in Figs. 1 and 2 of the drawings. In the valve shown in Figs. 3 to 5, inclusive, of the drawings, the valve seat 43 in the opening 22 is provided with two upwardly facing shoulders 44 and 45 to receive or cooperate with the disks 41 and 42, respectively. The upper or outer walls of the seat 43 may be tapered or curved outwardly as clearly illustrated in Figs. 4 and 5 of the drawings. The shoulders 44 and 45 are flat and at right angles to the axis of the opening 22.

The sealing disks 41 and 42 may be similar generally to the disk 13 described above. The sealing disks 41 and 42 are formed of a flexible or resilient material. The disk 41 for cooperating with the shoulder 44 may be directly mounted on the lower end of the valve head 12. The central portion of the disk 42 may be flat to seat against the lower end of the head 12. The lower disk 42 may be mounted against the lower side of the disk 41. The disks 41 and 42 may be secured to the valve head 12 by suitable screws 46. The disk 42 projects radially outward from the periphery of the head 12 and the outwardly projecting portion of the disk is curved outwardly and downwardly. The disk 41 is proportioned to freely pass into the opening 22 to engage the shoulder 44. The outer or peripheral portion of the disk 42 is bent or curved downwardly and outwardly as clearly illustrated in Figs. 4 and 5 of the drawings. The disk 42 is mounted and proportioned so that it may freely pass the shoulder 44. When the valve stem 11 is operated to close the valve, the peripheral edge of the disk 41 seats against the shoulder 44 and the peripheral edge of the disk 42 seats against the shoulder 45. Downward pressure imparted to the disks through the stem 11 and head 12 causes the disks to be expanded or flattened so that their peripheral edges are forced outwardly against the walls of the seat 43.

It is believed that the utility and operation of the valve provided by the present invention will be readily apparent from the foregoing detailed descriptions. It is to be noted that the invention provides a valve wherein a metal sealing disk or disks are operable to simultaneously seat axially or downwardly and radially outward to effect a tight seal. The sealing disks are mounted on the stem through the head 12 so that they effectively center themselves on the valve seat and are not forced to rotate when the stem 11 is operated. The valve is particularly effective in sealing off and preventing the leakage of light oils, etc., as the sealing disk or disks are retained in pressure engagement with two surfaces and the disks are centered on the seats so that their entire peripheral edges are in effective engagement with the seat. The head 12 may be easily removed from the stem 11 to permit the replacement of the sealing disks. It is to be noted that the valve head and sealing disk construction and the valve seat embodied in the present invention may be incorporated in valves of various types for handling fluid of various characters.

Having described only typical preferred forms of my invention, I do not wish to limit myself to the specific details set forth, but wish to reserve to myself any changes or variations that may appear to those skilled in the art or fall within the scope of the following claims:

Having described my invention, I claim:

1. In a valve a valve seat having a substantially axial wall, and a substantially radial shoulder projecting from the axial wall, a stem, a head rotatably and tiltably mounted on the stem, and a flexible member on the head having a radially and axially curved peripheral portion projecting from the head to initially engage the shoulder and operable to engage and seal with both the shoulder and said wall upon being flexed, the outer portion of the axial wall being curved downwardly and inwardly to guide the flexible member onto the seat.

2. A valve including a body having a fluid passage, a valve seat in the passage having a substantially axial wall and substantially radial shoulder, a stem extending into the body, a valve head rotatably and tiltably mounted on the stem, and a flexible sealing disk on the head having a concave edge portion projecting from the head to initially engage the shoulder and to engage and seal with both the shoulder and wall upon being pressed against the shoulder, the outer portion of the axial wall being curved downwardly and inwardly to guide the disc onto the seat.

3. A valve including a body having a fluid passage, a valve seat in the passage having a substantially axial wall and substantially radial shoulder, a stem extending into the body, a valve head mounted on the stem and adapted to tilt a limited extent relative to the stem, and a flexible sealing disk on the head having a concave edge portion projecting from the head to freely pass the said axial wall and engage the shoulder and operable upon being forced against the shoulder to engage both the shoulder and the axial wall, the upper portion of the axial wall being beveled inwardly and downwardly to guide the sealing disc onto the seat.

In witness that I claim the foregoing I have hereunto subscribed my name this 8th day of May, 1930.

BENJAMIN FRANKLIN DENGLER.